US 6,543,353 B1

(12) United States Patent
Ohlhauser et al.

(10) Patent No.: US 6,543,353 B1
(45) Date of Patent: Apr. 8, 2003

(54) METHOD FOR MONITORING A STRIP OF FABRIC

(75) Inventors: Stefan Ohlhauser, Heuchelheim (DE); Klaus-Dieter Pohl, Speyer (DE)

(73) Assignee: Koenig & Bauer Aktiengesellschaft, Wurzburg (DE)

( * ) Notice: Subject to any disclaimer, the term of this patent is extended or adjusted under 35 U.S.C. 154(b) by 0 days.

(21) Appl. No.: 09/719,180

(22) PCT Filed: Jun. 10, 1999

(86) PCT No.: PCT/DE99/01698

§ 371 (c)(1),
(2), (4) Date: Dec. 18, 2000

(87) PCT Pub. No.: WO99/65808

PCT Pub. Date: Dec. 23, 1999

(30) Foreign Application Priority Data

Jun. 18, 1998 (DE) .......................... 198 27 190

(51) Int. Cl.⁷ ............................................ B41F 13/56
(52) U.S. Cl. .................... 101/224; 101/224; 101/219; 101/484; 400/224; 400/618
(58) Field of Search ................... 101/224, 219, 101/178, 484, 487, 226, 138; 400/618

(56) References Cited

U.S. PATENT DOCUMENTS

| 3,871,598 A | | 3/1975 | Kataoka |
| 4,344,073 A | | 8/1982 | Rawlings |
| 5,188,028 A | | 2/1993 | Reichel |
| 5,277,378 A | | 1/1994 | Ebisawa |
| 5,301,866 A | * | 4/1994 | Veh et al. .................... 226/11 |
| 5,716,311 A | * | 2/1998 | Novick et al. ................ 493/32 |
| 5,894,797 A | * | 4/1999 | Brennan et al. ............ 101/226 |
| 5,996,492 A | * | 12/1999 | Jurkewitz et al. ........... 101/228 |
| 6,098,063 A | * | 8/2000 | Xie et al. ..................... 706/60 |
| 6,106,177 A | * | 8/2000 | Siegl et al. ................. 400/618 |
| 6,321,966 B1 | * | 11/2001 | Blanchard et al. ............ 226/11 |

FOREIGN PATENT DOCUMENTS

| DE | 22 56 882 B2 | 12/1973 |
| DE | 2 335 294 | 1/1974 |
| DE | 30 20 847 A1 | 1/1981 |
| DE | 40 39 108 C1 | 4/1992 |
| DE | 43 04 306 A1 | 8/1993 |
| DE | 43 22 991 A1 | 1/1994 |
| DE | 43 11 774 A1 | 10/1994 |
| DE | 44 25 355 A1 | 1/1995 |
| JP | 50-44958 | 4/1975 |
| JP | 55-66012 | 5/1980 |
| JP | 55-66013 | 5/1980 |
| JP | 5-215669 | 8/1993 |
| JP | 06155052 | 6/1994 |

OTHER PUBLICATIONS

Oldenburg, Wolfgang, "Winding and Spooling by Use of Mechanical Stepless Gearing Units and Electronic Controls", Kiepzig Fachberichle 79 (1971), pp. 317–330.

Kessler et al, "Structure and Control of Systems with Continuous Moving Elastic Webs and Multi–motor Drives", Regelungstechnik, (1984), pp. 251–266.

* cited by examiner

*Primary Examiner*—Andrew H. Hirshfeld
*Assistant Examiner*—Darius N. Cone
(74) *Attorney, Agent, or Firm*—Jones, Tullar & Cooper PC

(57) ABSTRACT

The tension in a moving web of material is measuring using a measuring roller or cylinder. This tension is repeatedly compared to a threshold value. If the measured value deviates from the threshold value beyond a certain amount, this is used as an indication of web tear or breakage.

10 Claims, 2 Drawing Sheets

METHOD FOR MONITORING A STRIP OF FABRIC

FIELD OF THE INVENTION

The present invention relates to a method for monitoring a web of material.

DESCRIPTION OF THE PRIOR ART

U.S. Pat. No. 4,344,073 describes a limit switch for watching for a tear in a web of material. This limit switch is arranged together with a compensating roller. In case of a tear in the web of material, the position of the compensating roller is changed and this change in position actuates the limit switch.

A measurement of the tension of the web of material, by operation of the compensating roller, is not provided.

DE 43 11 774 A1 discloses a safety device for a rotary printing press. Here, cylinders are provided which roll up the web of material in case of a tear of the web. At least one such cylinder is associated with a load sensing bearing. This load sensing bearing detects the pressure by the web of material rolled up between two cylinders, but does not detect the web tension.

DE 43 04 306 A1 describes a method for controlling the tension applied to a web in a web-retainer system. Here, an output characteristic of a tension device is used for controlling the torque of the retaining roller.

DE 40 39 108 C1 shows a device for preventing damage to the print units in case of a web tear. A measuring value sensor is installed on a chilling unit roller for measuring the web tension.

SUMMARY OF THE INVENTION

The object of the present invention is directed to providing a method for monitoring a web of material.

In accordance with the present invention, this object is attained by determining a gradient of a course of a web tension. A web tear is detected on the basis of a comparison of this gradient with a threshold value.

The advantages which can be achieved by the present invention reside, in particular, in that the measuring roller which detects the web tension is used as the detector for web tears. Fluttering of the web, or the change of the type of a web of material, does not result in an erroneous detection, as compared to prior art sensors measuring the distance from the web of material. Very short reaction times are possible because of the use of a stationary measuring roller in contrast to compensation rollers, since almost no moments of mass inertia need to be overcome.

The arrangement of the measuring roller of the present invention is independent, to a large extent, of the location of the web tear, since a drop in the web tension spreads very rapidly in the press.

The use of a percental threshold value for the permissible change of the web tension assures an evaluation of a web tear which is independent of production conditions.

BRIEF DESCRIPTION OF THE DRAWINGS

A preferred embodiment of the present invention is represented in the drawings and will be described in greater detail in what follows. Shown are in:

FIG. 1, a schematic lateral view of a rotary printing press, and in

DESCRIPTION OF THE PREFERRED EMBODIMENT

Figure 1:
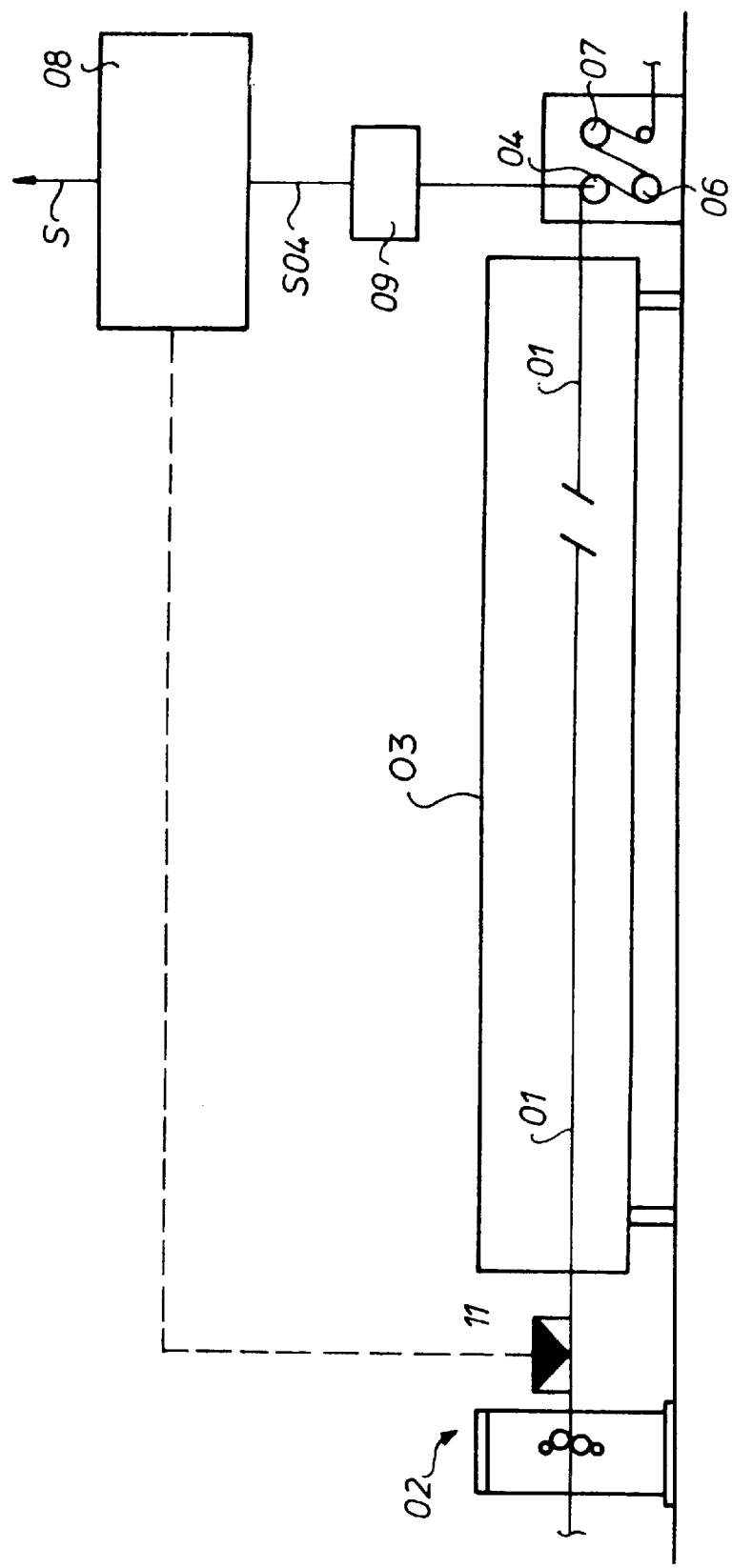
Figure 2:
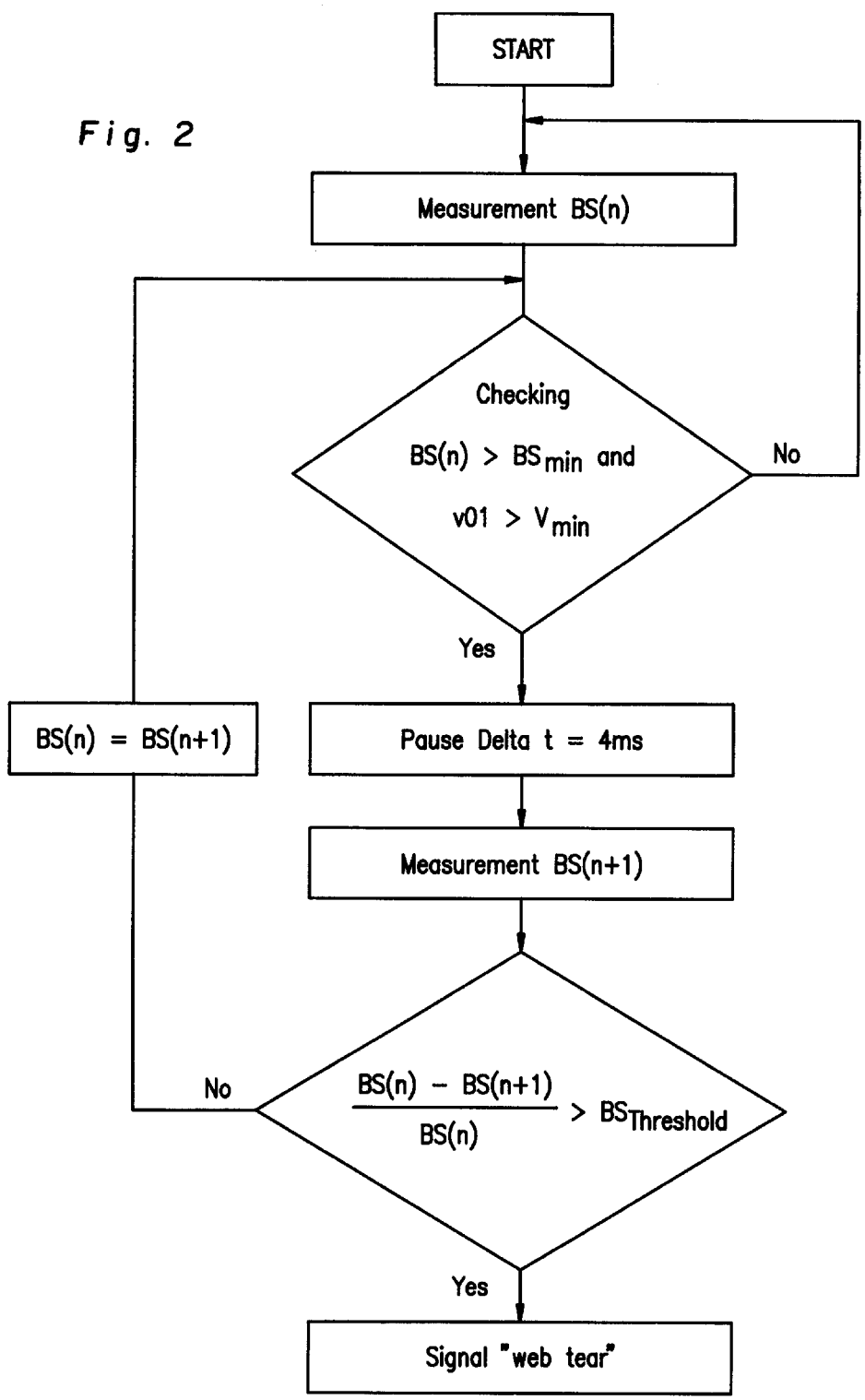
FIG. 2, a flow chart of a method for monitoring a web of material.

After leaving a print unit 02 in a rotary printing press, a web 01 of material is fed to a dryer 03, and thereafter to a group of chilling rollers 04, 06, 07, as seen in FIG. 1. At least one measuring roller 04, for example a chilling roller 04, around which the web 01 of material is at least partially looped, is provided with a load sensing bearing or measuring pin at least at one of its support journals. This load sensing bearing has, for example, wire strain gauges or piezo elements which are not specifically shown in FIG. 1. The measuring roller 04 is essentially arranged fixed in place. A web tension BS of the web 01 of material is determined by this measuring roller 04. This web tension BS is shown in the flow chart set forth in FIG. 2.

In the present embodiment, the measuring roller 04, embodied as a chilling roller 04, is the first contact location of the web 01 of material downstream of the dryer 03. In place of a measuring roller 04 designed as a chilling roller 04, it is possible to arrange one or several measuring rollers, which measure the web tension BS, at any other location of the printing press. In particular, a measuring roller, that is used for measuring the web tension BS, can be arranged downstream of every print unit.

A signal S04, which is assigned to the amount of the web tension BS, is generated by the load sensing bearing of the measuring roller 04. This signal S04 is fed to an evaluation device 08 and is processed there. This signal S04 can also be fed to a filter 09 located prior to the evaluation device 08, which filter is matched to the characteristic frequencies of the measuring roller 04. In this way, it is possible to filter out interfering frequencies for example 2 to 20 Hz.

In a method for monitoring the web tension BS of the web 01 of material in accordance with the present invention, which web 01 is traveling at a web speed V01, a first value BS(n) of the web tension BS is determined and stored. Subsequently, marginal conditions for the lowest web speed $V_{min}$ necessary and the lowest necessary web tension $BS_{min}$, as a function of the characteristic oscillation of the measuring roller, are checked. If these marginal conditions have been met, respective values BS(n), BS(n+1) of the web tension are determined at preset time intervals Delta t, for example Delta t=4 ms. These values BS(n) and BS(n+1) are subtracted from each other. Thus, the difference, Delta BS, between each two values BS represents a value of the change of the web tension per unit of time, or a measurement of the gradient, slope or rate of change of a course of the web tension. It is possible to also detect a change in the web tension on the basis of other connections, such as addition, multiplication or division.

The difference Delta BS, which equals BS(n)−BS(n+1) of two values BS(n), BS(n+1) is applied to the actual, last measured value BS(n+1), preferably the first determined value BS(n) is fixed as the reference value. In other words a percental change Delta %Bs of the web tension per unit of time is calculated in which Delta %BS=(BS(n)−BS(N+1))/BS(n). However, it is also possible, for example, to determine a percental change by a simple, quotient development, for example, Delta %BS=BS(n+1)/BS(n). In place of the constant change of the reference value BS(n) by the use measured values of the web tension, a "fixed", for example a manually entered reference value, is also possible. This reference value is fixedly preset for defined production conditions.

The percental change Delta %BS of the web tension is compared with a preset threshold value BS threshold for example, 0.5 and a signal S is output if the threshold value BS threshold is exceeded. A web catching device, for example, is actuated on the basis of this signal S, and/or the cylinders in the print units are moved away from each other also on the basis of this signal, S. Exceeding the preset threshold value of the percental change of the web tension BS threshold means that a web tear has occurred.

Thus, an available device for measuring and/or controlling the web tension is used for detecting a tear in the web 01 of material.

A further sensor 11, for example an optical one, can be arranged for detecting a web tear. This is used in particular at low web speeds for example less than 20,000 copies or sheets per hour.

While a preferred embodiment of a method for monitoring a strip or web of fabric in accordance with the present invention has been set forth fully and completely hereinabove, it will be apparent to one of skill in the art that a number of changes in, for example the type of print unit used, the specific kind of material web and the like could be made without departing from the true spirit and scope of the present invention which is accordingly to be limited only by the following claims.

What is claimed is:

1. A method for monitoring a moving web of material including:
    measuring a first web tension of said moving web of material at a first time;
    measuring a second web tension of said moving web of material at a second time subsequent to said first time;
    determining a difference between said first web tension and said second web tension;
    using said difference between said first web tension and said second web tension as a value of a change of said web tension per unit of time;
    providing a threshold value of said change of said web tension per unit of time;
    comparing said value of said change of said web tension per unit of time with said threshold value of said change of said web tension per unit of time;
    generating a signal when said value of said change of said web tension per unit of time exceeds said threshold value of said change of said web tension per unit of time; and
    determining the occurrence of a tear in said web of material from said generation of said signal.

2. The method of claim 1 further including applying said value of said change of said web tension per unit of time to a reference value (BS(n)) of said web tension, and evaluating a function developed from said value of said change of said web tension per unit of time applied to said reference value (BS(n)).

3. The method of claim 2 further including developing said reference value (BS(n)) from a measured value (BS(n)).

4. The method of claim 3 further including continuously updating said reference value (BS(n)) of said web tension.

5. The method of claim 4 further including developing said reference value (BS(n)) of said web tension using an actual value (BS(n+1)) obtained from a previous one of said continually updated reference values (BS(n)).

6. The method of claim 12 further including determining said reference value (BS(n)) from defined production conditions.

7. The method of claim 1 further including providing a web tension measuring roller, mounting said web tension measuring roller in place, and using said web tension measuring roller for measuring said web tensions.

8. The method of claim 1 further including providing a web catching device and actuating said web catching device in response to said determining the occurrence of a tear in said web of material.

9. The method of claim 1 further including providing means for moving cylinders of print units apart in case of a tear in said web of material, and moving said cylinders apart in response to said determining the occurrence of a tear in said web of material.

10. The method of claim 1 further including providing a print unit and measuring said web tensions downstream, in a direction of web travel, of said print unit.

* * * * *